US011267701B2

(12) United States Patent
Bouvier et al.

(10) Patent No.: US 11,267,701 B2
(45) Date of Patent: Mar. 8, 2022

(54) GAS GENERATION DEVICE (71) Applicant: COMMISSARIAT A L'ENERGIE ATOMIQUE ET AUX ENERGIES ALTERNATIVES, Paris (FR)

(72) Inventors: Michael Bouvier, Varces Allieres et Risset (FR); Philippe Capron, Virieu sur Bourbre (FR); Jerome Delmas, Merignac (FR); Vincent Mathieu, Saint Cassien (FR); Isabelle Rougeaux, Chabons (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/753,238

(22) PCT Filed: Oct. 18, 2018

(86) PCT No.: PCT/EP2018/078514
§ 371 (c)(1),
(2) Date: Apr. 2, 2020

(87) PCT Pub. No.: WO2019/077024
PCT Pub. Date: Apr. 25, 2019

(65) Prior Publication Data
US 2020/0325016 A1 Oct. 15, 2020

(30) Foreign Application Priority Data
Oct. 18, 2017 (FR) ...................................... 1759788

(51) Int. Cl.
| *C01B 3/04* | (2006.01) |
| *C01B 3/06* | (2006.01) |
| *B01J 16/00* | (2006.01) |
| *B01J 19/18* | (2006.01) |
| *H01M 8/04082* | (2016.01) |
| *H01M 8/065* | (2016.01) |

(52) U.S. Cl.
CPC ............ *C01B 3/065* (2013.01); *B01J 16/005* (2013.01); *B01J 19/18* (2013.01); *H01M 8/04216* (2013.01); *H01M 8/065* (2013.01)

(58) Field of Classification Search
CPC ...................................................... B01J 19/18
See application file for complete search history.

(56) References Cited

U.S. PATENT DOCUMENTS

| 8,172,912 | B2* | 5/2012 | Marsh | ................ | B01J 19/1893 |
| | | | | | 48/61 |
| 8,586,004 | B2* | 11/2013 | Rosenzweig | ............ | A61P 7/04 |
| | | | | | 423/657 |
| 8,974,765 | B2* | 3/2015 | Boyle | ...................... | C01B 3/08 |
| | | | | | 423/658.2 |
| 9,005,344 | B2* | 4/2015 | Curello | ................. | B01D 71/34 |
| | | | | | 96/7 |
| 9,156,687 | B2 | 10/2015 | Wallace et al. | | |
| 2008/0014479 | A1 | 1/2008 | Fiebig | | |
| 2008/0014481 | A1 | 1/2008 | Fiebig | | |
| 2011/0212374 | A1 | 9/2011 | Rosenzweig et al. | | |
| 2016/0087294 | A1 | 3/2016 | Rosenzweig et al. | | |

FOREIGN PATENT DOCUMENTS

| CN | 1774390 A | 5/2006 |
| CN | 101755360 A | 6/2010 |
| CN | 201842638 U | 5/2011 |
| CN | 102203998 A | 9/2011 |
| CN | 103069631 A | 4/2013 |
| WO | WO 2010/051557 A1 | 5/2010 |
| WO | WO 2012/003112 A1 | 1/2012 |
| WO | WO 2017/164812 A1 | 9/2017 |

OTHER PUBLICATIONS

Written Opinion of International Searching Authority dated Jan. 10, 2019 in corresponding PCT Application No. PCT/EP2018/078514, filed Oct. 18, 2018 (with English translation)(9 pages).
Combined Chinese Office Action and Search Report dated Nov. 24, 2020 in Patent Application No. 201880068407.4 (with English translation and English translation of Category of Cited Documents), citing documents AA and AO-AS therein, 12 pages.
International Search Report dated Jan. 10, 2019 in PCT/EP2018/078514 filed Oct. 18, 2018, 2 pages.

* cited by examiner

*Primary Examiner* — Stuart L Hendrickson
(74) *Attorney, Agent, or Firm* — Oblon, McClelland, Maier & Neustadt, L.L.P.

(57) ABSTRACT

A catalytic device includes a hollow body, a piston housed in the hollow body, a catalyst of a gas generation reaction based on bringing a reactive liquid into contact with the catalyst, the catalyst being housed in a catalysis chamber, the piston and the hollow body defining a hermetic compression chamber for containing a compressible fluid, and being mobile relative to one another between a closed position in which the catalysis chamber is tight to the reactive liquid, and an open position for the entry of the reactive liquid into the catalysis chamber. The catalytic device is conformed to switch from the open position to the closed position, respectively from the closed position to the open position, when the compressible fluid is contained in the compression chamber and a force applied to the piston is greater than or equal to, respectively less than, a closure force.

17 Claims, 4 Drawing Sheets

GAS GENERATION DEVICE

The present invention relates primarily to an apparatus for generating a gas, and notably dihydrogen, based on bringing a reactive liquid into contact with a catalyst.

A well known method for generating dihydrogen consists in bringing an aqueous hydride solution, for example a solution of sodium borohydride, into contact with a catalyst of the hydride hydrolysis reaction, formed for example by cobalt, platinum, ruthenium, or nickel. On contact with the catalyst, a reaction of hydrolysis of the aqueous solution occurs, generating dihydrogen.

As an illustration, WO 2012/003112 A1 and WO 2010/051557 A1 each describe an apparatus for implementing such a catalyzed hydride hydrolysis. The gas generation apparatuses described in these documents each comprise an enclosure containing, in operation, an aqueous solution of hydride, and a catalytic device defining a catalysis chamber containing a catalyst of the hydrolysis of the aqueous hydride solution. The catalytic device comprises a body and a removable cover. In the closed position of the catalytic device, the cover and the body together isolate the catalyst from the aqueous hydride solution. There is then no generation of dihydrogen. In the open position of the catalytic device, the cover is disposed at a distance from the body. The aqueous hydride solution then enters into contact with the catalyst, thus initiating the generation of dihydrogen, which is discharged out of the enclosure by means of a discharge valve.

To avoid the generated dihydrogen pressure being too high inside the enclosure, the catalytic device described in WO 2012/003112 A1 comprises an elastomer membrane, in the form of a hollow cylindrical tube, fixed both to the body and to the cover. The body also comprises a drain emerging out of the enclosure at one of its ends and inside the interior space of the membrane at its opposite end, such that the pressure in the interior space of the membrane is equal to atmospheric pressure. Thus, when the dihydrogen pressure in the enclosure results in a force greater than a closure force, the cover is pushed against the body under the effect of said force, contracting the elastomer membrane by torsion effect, to the closed position of the catalytic device. When the pressure in the enclosure results in a force less than the closure force, the elastomer membrane, seeking to revert to its position of equilibrium, is deployed and releases the cover into the open position of the catalytic device, so as to allow the aqueous hydride solution to access the catalyst.

However, in order to ensure a contraction and an optimal deployment of the elastomer membrane, it is necessary for the height of the membrane to be small, which limits the access of the hydride-based aqueous solution to the catalyst, and limits the dihydrogen production yield.

Furthermore, the closure force of the catalytic device is determined by the rigidity of the elastomer membrane which depends on its form, on its dimensions, notably on its thickness, and on its mechanical, notably elastic, properties. Dimensioning the elastomer membrane is therefore complex to ensure effective hydrolysis.

There is therefore a need for a useful apparatus for generating a gas based on bringing a reactive liquid into contact with a catalyst that overcomes the abovementioned drawbacks.

To this end, the invention proposes a catalytic device comprising:
- a hollow body,
- a piston housed in the hollow body,
- a catalyst of a gas generation reaction based on bringing a reactive liquid into contact with the catalyst, the catalyst being housed in a catalysis chamber, the piston and the hollow body defining a hermetic compression chamber for containing a compressible fluid, and being mobile relative to one another between a closed position in which the catalysis chamber is tight to the reactive liquid, and an open position for the entry of the reactive liquid into the catalysis chamber, the catalytic device being conformed to switch from the open position to the closed position, respectively from the closed position to the open position, when the compressible fluid is contained in the compression chamber and a force applied to the piston is greater than or equal to, respectively less than, a closure force.

The "closure force" corresponds to the minimum force from which the catalytic device is in the closed position.

As will clearly emerge hereinbelow, the device according to the invention makes it possible to dispense with the taking of a reference pressure, notably atmospheric, to define the closure force. The manufacture of the device is thus simplified. Moreover, the stroke of the piston can easily be adapted to correspond to the gas generation needs. As will be detailed hereinbelow it is thus possible to promote the access of the reactive liquid to the catalysis chamber and to optimize the access of the reactive liquid to the catalyst. It is thus possible to reduce the quantity of catalyst compared to a catalytic device of the prior art, while retaining an at least equal, even greater, yield. Moreover, as will appear more clearly hereinbelow, the catalytic device according to the invention can house a catalyst of varied form, which makes it possible to simplify the catalyst forming method. Moreover, the closure force can easily be defined through adaptation of the volume and/or of the pressure of the compressible fluid in the extreme open position, i.e. in the position in which the piston is at the end of its stroke. Finally, the catalytic device according to the invention makes it possible to dispense with the implementation of means, such as a pressure sensor and a servocontrol unit, for regulating the pressure inside the compression chamber. It can therefore operate autonomously, without requiring further electrical power supply means to move the piston relative to the hollow body.

Moreover, the invention can comprise one or more of the following optional features.

The catalyst is preferably suitable for catalyzing the hydrolysis of an aqueous solution comprising a hydride. Preferably, the catalyst comprises more than 95.0%, even more than 99.0%, of a metal chosen from among platinum, ruthenium, cobalt, nickel and the alloys thereof.

Preferably, the catalyst is fixed, preferably rigidly, to the piston and/or to the hollow body.

In particular, the catalyst can be disposed on a catalysis support, preferably porous, in the form of a block of a thickness greater than 1 mm. The catalysis support can be formed by a ceramic, polymer or preferably metallic material. In particular, the catalyst can be disposed in the pores of the catalysis support. Preferably, the percentage by weight of the catalyst, expressed on the basis of the sum of the weight of the catalysis support and weight of the catalyst, is greater than 50.0%.

As a variant, the catalyst can be in the form of a covering having a thickness less than 1 mm.

The compressible fluid can be contained in the compression chamber.

Preferably, the compressible fluid is a gas, preferably chosen from among an inert gas and air. Air offers the advantage of low cost. An inert gas is preferred for its inert chemical properties.

The pressure of the compressible fluid in the extreme open position can be equal to, even greater than atmospheric pressure. Preferably, in a variant in which the device comprises an abutment disposed so that the piston bears against said abutment in the extreme open position, in the extreme open position, the pressure of the compressible fluid is greater than 1.1 bar, even preferably greater than 1.2 bar. The "pressure" is defined relative to the zero pressure reference in the vacuum.

Preferably, the pressure of the compressible fluid in the compression chamber in the closed position is greater than the pressure of the compressible fluid in the compression chamber in the extreme open position.

Preferably, the pressure of the compressible fluid in the compression chamber, in the closed position, is greater than atmospheric pressure.

Preferably, the piston and the hollow body are translationally and/or rotationally mobile relative to one another between the open and closed positions. Preferably, the piston is translationally mobile relative to the hollow body along a single axis. Preferably, the hollow body is conformed to guide the piston in translation. Preferably, the hollow body comprises a hollow cylindrical guiding drum conformed to guide the piston in translation.

Preferably, no piston return means, notably a spring, is housed in the compression chamber.

Preferably, the piston and the hollow body define the catalysis chamber. Thus, the catalytic device is easy to manufacture, the catalysis chamber and the compression chamber being defined by the same units.

In one embodiment, the body can be of a single piece. As a variant, the body can comprise one part with a plug removably mounted on the part.

The body can comprise a relief valve configured to drain the compressible fluid from the compression chamber.

The device preferably comprises an abutment disposed so that the piston bears against said abutment in the extreme open position.

In one embodiment, the body can comprise a part having a hollow cylindrical guiding drum conformed to guide the piston, a storage tank and a fluidic connection member linking said part to the storage tank. For example, the guiding drum can be disposed in the enclosure of a gas generation apparatus and the storage tank can be disposed outside of said enclosure. Thus, by remotely siting the volume of compressible fluid outside of the enclosure, the volume accessible to the liquid in the enclosure is increased.

The piston preferably comprises a cover, the cover bearing on the hollow body in the closed position and completely blocking the opening, and being disposed at a distance from the hollow body in the open position.

Preferably, in the open position, when the interior space of the enclosure contains the reactive liquid, more than 50%, preferably more than 80%, preferably more than 90%, even notably all of the surface of the catalyst not in contact with the piston and/or with the hollow body is exposed to the reactive liquid.

Preferably, at least a part of the catalyst is fixed to the hollow body and/or to the piston.

Preferably, the closure force is greater than the force exerted by the pressure of the compressible fluid on the piston in the extreme open position.

The invention relates also to a gas generation apparatus comprising an enclosure defining an interior space for containing a reactive liquid, and a catalytic device according to the invention, the apparatus being configured so that when the interior space contains the reactive liquid, in the open position of the catalytic device, the catalytic chamber is fluidically connected with the interior space, so that the gas is generated by bringing the reactive liquid into contact with the catalyst, and in the closed position of the catalytic device, the catalyst is isolated from the reactive liquid.

Preferably, the catalytic device is disposed at least partially, even fully, inside the interior space of the enclosure.

In particular, the body of the catalytic device can comprise a part having a hollow cylindrical guiding drum conformed to guide the piston, a storage tank and a fluidic connection member linking said part to the storage tank, the storage tank being disposed outside of the interior space of the enclosure.

In one embodiment, when the interior space of the enclosure contains the reactive liquid, the piston is closer to the free surface of the reactive liquid in the closed position than in the open position.

The enclosure can contain the reactive liquid. Preferably, in the extreme open position, the pressure of the compressible fluid in the compression chamber is greater than the gas pressure in the interior space.

Moreover, the apparatus can comprise at least two catalytic devices.

The invention relates also to a method for dimensioning a device according to the invention wherein:
  the stroke of the piston between the closed position and the extreme open position is defined by the selection of at least one parameter chosen from among the closure force, the volume of the compression chamber in the extreme open position, the pressure of the compressible fluid in the extreme open position and, if appropriate, the diameter of the guiding drum, or
  the closure force is defined by the selection of at least one parameter chosen from among the volume of the compression chamber in the extreme open position, the pressure of the compressible fluid in the extreme open position, the stroke of the piston and, if appropriate, the diameter of the guiding drum.

The extreme open position can be defined by means of an abutment disposed so that the piston bears against said abutment in the extreme open position.

The invention also relates to a gas generation method based on bringing a reactive liquid into contact with a catalyst of the gas generation reaction, the method comprising the following successive steps of:
  i) obtaining an apparatus according to the invention in which the interior space of the enclosure contains the reactive liquid,
  ii) placing the catalytic device in the open position, so that the reactive liquid enters into contact with the catalyst.

Preferably, the gas is dihydrogen, the catalyst is suitable for catalyzing the hydrolysis of an aqueous solution comprising a hydride, preferably the catalyst comprises more than 95.0% of a metal chosen from among platinum, ruthenium, cobalt, nickel and the alloys thereof, and the reactive liquid is an aqueous solution comprising a hydride.

The invention finally relates to an electrical generator comprising:
  a fuel cell for generating an electric current by gas oxidation,
  a gas generation apparatus according to the invention, the apparatus being fluidically connected with the fuel cell and being configured to supply the fuel cell with said gas.

Other features, variants and advantages of the invention will emerge more clearly on reading the following detailed description and examples, given in an illustrative and non-limiting manner, and on studying the attached drawing, in which.

In the figures, the scales and proportions of the different members and units that make up the apparatus and the device are not necessarily respected. Moreover, in the interests of clarity, the members may be represented as not being in contact with one another while they are so in practice. Moreover, different references can denote one and the same member.

Figure 1:
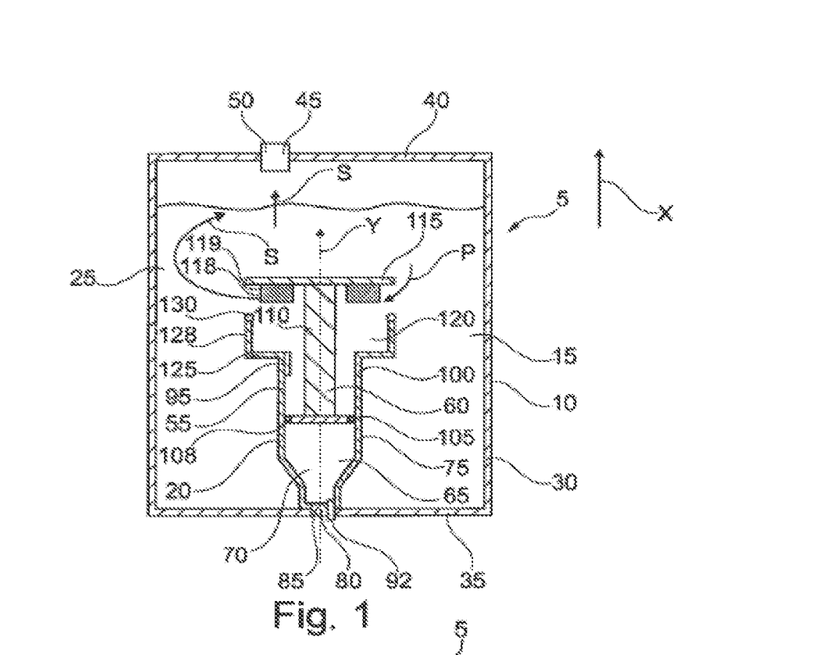
FIGS. 1 and 2 represent, in cross section on a longitudinal plane, an example of gas generation apparatus according to the invention, in which the catalytic device is disposed in open position, respectively in closed position.

FIG. 1 represents an example of production of a gas generation apparatus 5 according to the invention.

The apparatus comprises an enclosure 10 defining an interior space 15, in which there is disposed a catalytic device 20 according to the invention.

In the example illustrated in FIG. 1, the enclosure contains a reactive liquid 25. For example, when the apparatus is intended to generate dihydrogen, the reactive liquid contained in the enclosure is an aqueous hydride solution, comprising, for example, sodium borohydride and/or potassium borohydride. Moreover, prior to the gas generation, the interior space may be free of the reactive liquid.

The enclosure comprises a lateral wall 30 which extends in a longitudinal direction X, a bottom wall 35 defining a bottom of the enclosure when the longitudinal direction X is parallel to the direction of gravity and oriented opposite to the direction of gravity, as illustrated in FIG. 1, and a top wall 40, having a gas discharge aperture 45. As is illustrated in FIGS. 1 and 2, a valve 50 can be disposed in the gas discharge aperture.

Figure 7:
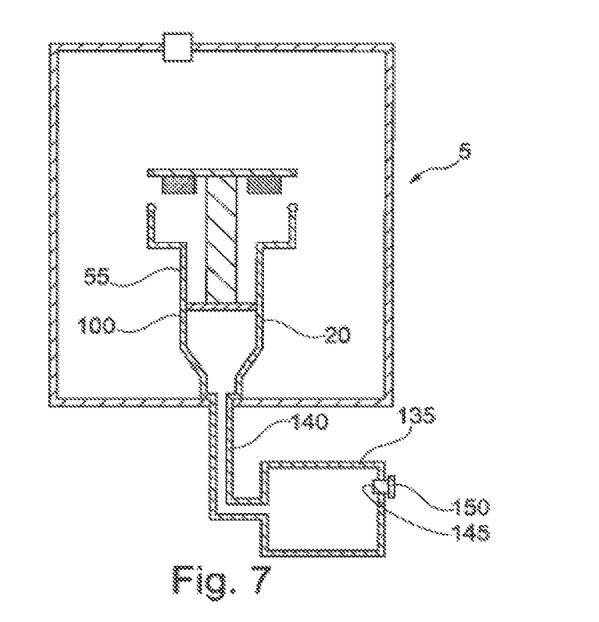

In the example of FIG. 1, the catalytic device is disposed in the interior space of the enclosure, and is fixed to the bottom of the enclosure. Other dispositions of the catalytic device can however be envisaged. For example, the catalytic device can be fixed to at least one of the lateral walls or to the top wall. Moreover, the catalytic device can be disposed partially outside of the interior space, as illustrated in FIG. 7. It can even be disposed completely outside of the interior space.

Figure 2:
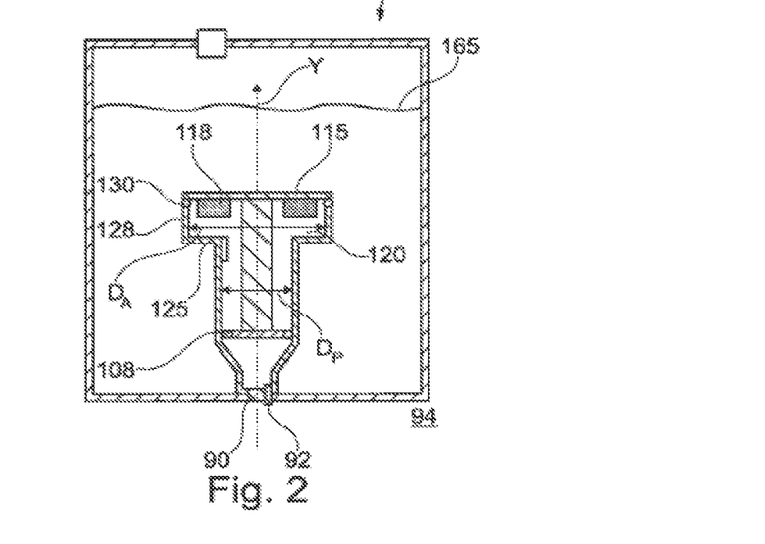

The catalytic device illustrated in FIGS. 1 and 2 comprises a hollow body 55 in which a piston 60 is housed. The hollow body and the piston together define a compression chamber 65 containing a compressible fluid. In the examples of FIGS. 1 and 2, the chamber contains said compressible fluid 70. In the example of FIGS. 1 and 2, the hollow body comprises a part 75 having an aperture 80 passing through the wall of the part thickness-wise and a plug 85 removably mounted on the part. The aperture is formed on a wall of the part in contact with the bottom of the container, and the bottom of the container comprises a hole 90 emerging on the aperture of the part. In this way, by removing the plug from the part, it is possible to fill the compression chamber with the compressible fluid. In order to ensure the tightness to the compressible fluid, the plug is preferably topped by a tight seal sandwiched between the part and the plug when the plug is mounted on the part. In a variant not represented, the piston has an aperture formed by a removable plug, so as to introduce the compressible fluid into the compression chamber. In another variant, the aperture 80 is provided with an inflation valve, for adjusting the pressure of the compressible fluid according to the application for which the device is intended. For example, according to a variant implementation of the catalytic device, the compression chamber is free of compressible fluid, the catalytic system is disposed in closed position, and less than one hour, even less than 10 minutes, even less than 5 minutes before the setting of the catalytic system to the open position, the compressible fluid is injected into the compression chamber via the inflation valve.

As specified above, the compression chamber is hermetic. Thus, when the compressible fluid is contained in the compression chamber, the leakage of the compressible fluid out of said compression chamber is substantially zero.

Moreover, the hollow body comprises a relief valve 92 disposed in an aperture formed in the wall of the body and in the wall of the enclosure. The relief valve is configured so that when the pressure in the compression chamber exceeds a critical value, the relief valve is opened, fluidically connecting the enclosure with the environment 94 outside the enclosure, which is preferably at atmospheric pressure.

The piston and the hollow body are mobile relative to one another, preferably translationally and/or rotationally. Preferably, they are translationally mobile along a single axis relative to one another, as is illustrated in FIGS. 1 and 2, between an open position and a closed position. Obviously, as clearly appears in said figures, the catalytic device can be disposed in several open positions. Notably, when the piston has reached its stroke, the device is disposed in extreme open position.

In the example illustrated in FIGS. 1 and 2, the hollow body comprises a hollow cylindrical guiding drum 100 of axis Y, preferably of revolution, and the piston comprises a piston head 105, one face of which partially defines the compression chamber. The piston head takes the form of a plate in FIGS. 1 and 2, but other forms can be envisaged. Moreover, in the example of FIGS. 1 and 2, the device is in extreme open position when the piston head is in contact with an abutment 95 disposed on the inner wall of the guiding drum.

The piston head has a section, observed in the plane normal to the axis Y of the guiding drum, of a form complementing the section of the internal wall of the guiding drum, so as to tightly seal the compression chamber. In order to further improve said seal tightness, the piston head can comprise an annular seal 108 bearing on the inner wall of the guiding drum.

Moreover, the piston comprises a shaft 110, coaxial with the guiding drum, rigidly fixed at one of its ends to the piston head, and a cover 115, rigidly fixed to its opposite end. A catalyst 118 of the gas generation reaction based on bringing the catalyst into contact with the reactive liquid is disposed on the cover. It is housed in the hollow body in the closed position of the catalytic device.

In closed position, the cover rests on the hollow body. Thus, as clearly appears in FIG. 2, the piston and the hollow body together define a catalysis chamber 120.

In the example of FIG. 1, the body also comprises a shoulder 125 which extends an annular portion 128, the end face of which is topped by a seal 130, on which the cover 115 comes to rest in closed position. The assembly formed by the shoulder and the annular portion defines a receptacle for housing the catalyst in closed position. The annular portion is cylindrical, preferably of revolution, and its axis can coincide with the axis Y of the guiding drum. The diameter $D_A$ of the annular portion is greater than the diameter $D_P$ of the piston head, the diameters being measured at right angles to the axis Y of the annular portion. The diameter of the annular portion, greater than that of the guiding portion and of the piston head, also makes it possible to define a catalysis chamber of large volume, thus favoring the exchange between the reactive liquid and the catalyst in open position. In an embodiment that is not represented, the device can comprise neither the shoulder nor the annular portion and the cover can rest in closed position directly on the guiding drum, possibly topped by a seal. In a variant, the face of the cover facing the catalysis chamber can be covered with a layer of a flexible polymer, for example of silicone or of "epdm" elastomer, to ensure the seal tightness of the catalytic chamber in closed position.

In the example of FIG. 1, the catalyst 118 is disposed on a catalysis support 119 fixed to the cover 115. As a variant, it can be disposed on the piston. In another variant, it can be disposed on the hollow body and/or fixed to the hollow body. In particular, it can be disposed on the shoulder 125 and/or on the annular portion 128. In another variant, a part of the catalyst can be disposed in contact with the hollow body and another part of the catalyst can be disposed on the piston.

Regarding the form of the catalyst, it can take the form of a covering, of a thickness less than 1 mm, for example deposited on the face of the cover of which a normal is oriented toward the catalysis chamber or on the inner face of the wall of the hollow body, for example on the inner wall of the annular portion 128 or of the shoulder 125. The cover can be deposited chemically or electrochemically or by physical vapor phase deposition or chemical vapor phase deposition.

As detailed above, the catalyst can, as a variant, be deposited in the pores of a porous catalysis support.

An implementation of the method according to the invention by means of a catalysis device according to the invention, as for example illustrated in FIG. 1, is detailed hereinbelow.

Prior to the gas generation, the catalytic device is preferably disposed in the closed configuration. Thus, the gas generation is prevented, the reactive liquid contained in the enclosure not being able to penetrate into the catalysis chamber. In order to initiate the generation of gas, the device is then disposed in the open position.

In a variant, prior to the gas generation, the catalytic device can be disposed in open configuration. The gas generation is initiated, the gas pressure in the enclosure increases until the resulting force that it exerts on the catalytic device disposes the catalytic system in the closed position.

In another variant, prior to the gas generation, the enclosure can include the reactive liquid under pressure, and the force exerted by the pressure of the reactive liquid under pressure keeps the catalytic system in the closed position until the gas generation is initiated.

As a variant, prior to the gas generation, the catalytic device is disposed in the open position, and the enclosure is free of the reactive liquid. The enclosure can however include a liquid other than the reactive liquid, for example water, but which, on contact with the catalyst, does not react to generate a gas. For example, to initiate the gas generation reaction a salt, notably borohydride, is poured into the interior space to form the reactive liquid by dissolution in the water.

Prior to the gas generation, an initial reactive liquid pressure prevails in the interior space of the enclosure. The initial pressure is less than or equal, even equal to the pressure in the compression chamber. In particular, it can be equal to atmospheric pressure.

In the variant in which, prior to the gas generation, the device is in the open position and the pressure of the compressible fluid is greater than the pressure in the enclosure, the compressible fluid exerts a thrust effort on the piston so as to increase the volume of the compression chamber. Preferably, the catalytic device comprises an abutment, such as, for example, that bearing the reference 95 illustrated in FIG. 1, so as to limit the stroke of the piston in the hollow body and thus define the extreme open position.

In the variant in which, prior to any gas generation, the device is in the open position and the pressure in the compression chamber is equal to the pressure in the enclosure, the efforts resulting from the effects of the pressures of the compressible fluid and of the reactive liquid and by the weight of the piston are neutralized, defining the extreme open position of the device.

In the open position, the reactive liquid contained in the enclosure can penetrate into the catalysis chamber through the aperture defined between the piston and the hollow body. The reactive liquid enters into contact with the catalyst, and the gas is thus generated. The gas is then discharged by buoyancy effect out of the catalysis chamber to the interior space of the enclosure as illustrated by the arrow S. Since the volume of the enclosure assessable to the gas is limited, the pressure of the gas and the pressure of the reactive liquid increase in the enclosure. Notably, as long as the reactive liquid enters into contact with the catalyst, the gas is generated and the pressure of the gas and the pressure of the reactive liquid increase. The gas contained in the enclosure can moreover be discharged through the discharge valve out of the enclosure.

Since the pressure in the enclosure is greater than the pressure of the compressible fluid in the compression chamber, the resulting effort on the piston displaces the piston which compresses the compressible fluid. The volume of the compression chamber decreases and the pressure of the compressible fluid of the compression chamber increases. The compression movement of the piston continues until the pressure in the compression chamber is balanced with the pressure in the enclosure. The device can thus be disposed in an intermediate open position between the extreme open position and the closed position. In the example of FIG. 2, the pressure in the enclosure is equal to a threshold pressure such that the device is brought into closed position. In the example of FIGS. 1 and 2, the closure of the device by displacement of the piston is effected by covering of the annular portion 128 with the cover 115, blocking the catalysis chamber. The gas generation is then inhibited, the catalysis chamber being tight to the reactive liquid in the closed position. The reactive liquid contained in the enclosure can then no longer penetrate into the catalysis chamber. The device is thus disposed in closed position as soon as the pressure in the enclosure results in a force being exerted on the piston that is greater than or equal to the closure force. In the variant in which the catalytic device supplies a fuel cell, the gas generated prior to the closure of the catalytic device still contained in the enclosure is then discharged out of the enclosure through the valve.

Thus, the pressure of the reactive liquid becomes less than or equal to the pressure of the compressible fluid in the compression chamber. The resulting effort on the piston is then such that the compressible fluid pushes back the piston from the closed position to the open position, even to the extreme open position. The reactive liquid then once again enters into contact with the catalyst and the gas generation recommences. The succession of opening/closing cycles thus continues for as long as the bringing of the reactive liquid into contact with the catalyst results in gas production.

Moreover, as has been detailed previously, the dimensioning of the catalytic device can be adapted to the specific constraints linked to the use of the gas generated by means of the catalytic device. For example, when the gas generated is dihydrogen and is intended to supply a fuel cell, the catalytic device can be dimensioned so that the dihydrogen at the output of the apparatus exhibits a pressure corresponding to that necessary for an optimal yield of the fuel cell.

In particular, the stroke of the piston between the closed position and the extreme open position can be defined by the selection of at least one parameter chosen from among the closure force, the volume of the compression chamber in the extreme open position, the pressure of the compressible fluid in the extreme open position and, if appropriate, the diameter of the guiding drum. As a variant, the closure force can be defined by the selection of at least one parameter chosen from among the volume of the compression chamber in the extreme open position, the pressure of the compressible fluid in the extreme open position, the stroke of the piston and, if appropriate, the diameter of the guiding drum.

Thus, the exposure of the catalyst to the reactive liquid in the open position can be optimized while keeping a compact device, occupying a limited volume within the gas generation apparatus.

Figure 3:
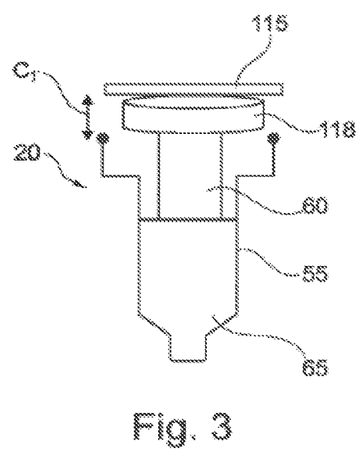
FIGS. 3 to 8 illustrate different variants of the catalytic device according to the invention.
Figure 4:
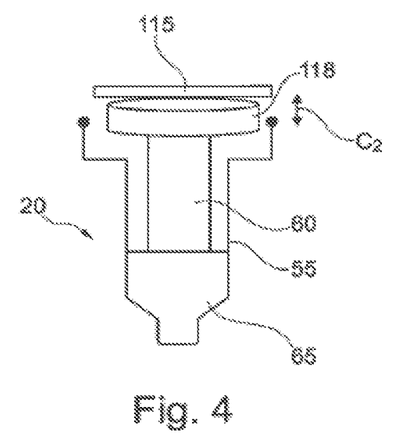

For example, FIGS. 3 and 4 illustrate examples of devices disposed in extreme open position and configured to reach their closed position for an identical closure force. The catalytic devices of FIGS. 3 and 4 comprise identical hollow bodies and pistons, and differ only by the volume of compressible fluid that they contain in extreme open position. Notably, the pressure of the compressible fluid in the extreme open position is identical for both devices. For an identical pressure variation between the extreme open and closed positions, the stroke $C_1$ of the piston of the catalytic device of FIG. 3 is greater than the stroke $C_2$ of the piston of the catalytic device of FIG. 4. Thus, between the extreme open position and the closed position, the catalytic device of FIG. 3 more favors the exposure of the catalyst to the reactive liquid compared to the catalytic device of FIG. 4. The catalytic device illustrated in FIG. 4 does however offer the advantage of better compactness than that illustrated in FIG. 3.

Figure 5:
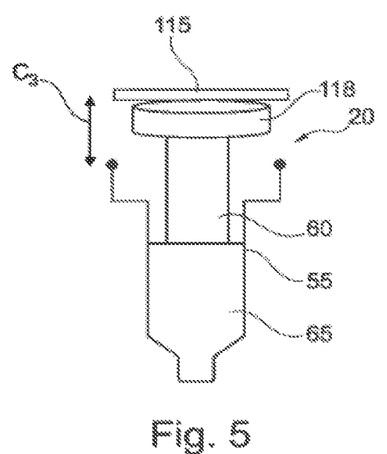
Figure 6:
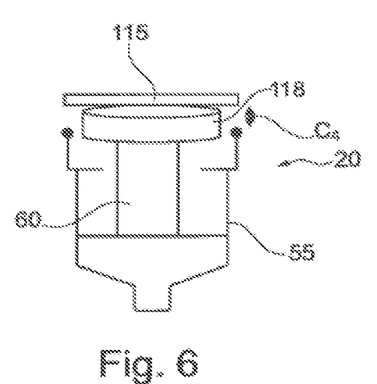

FIGS. 5 and 6 illustrate catalytic devices configured to reach their closed position for an identical closure force. The catalytic device of FIG. 6 differs from the catalytic device of FIG. 5 in that it has a guiding drum of greater diameter. In the extreme open positions, the catalytic devices of FIGS. 5 and 6 comprise an identical volume of compressible fluid. Moreover, the pressure of the compressible fluid in the extreme open position is identical for both devices. For an identical pressure variation between the extreme open and closed positions, the stroke $C_3$ of the piston of the catalytic device of FIG. 5 is greater than the stroke $C_4$ of the piston of the device of FIG. 6. Thus, between the extreme open position and the closed position, the catalytic device of FIG. 5 more favors the exposure of the catalyst to the reactive liquid compared to the catalytic device of FIG. 6.

The apparatus represented in FIG. 7 differs from that illustrated in FIG. 1 in that the catalytic device is disposed partially within the enclosure. The catalytic device has a body comprising a part having a hollow cylindrical guiding drum 100 in which the piston is housed, a storage tank 135 and a fluidic connection member 140 linking said part to the storage tank. The fluidic connection member can be a flexible pipe as presented in FIG. 7, or a rigid connector. It can be removably mounted, for example screwed onto the part or onto the enclosure. As a variant, the fluidic connection member and the part define a monolithic assembly. Regarding the storage tank, in the example of FIG. 7, it is disposed outside of the enclosure. As a variant, it can be disposed in the enclosure. Moreover, as illustrated in FIG. 7, it can comprise an aperture 145 passing through a wall of the tank thickness-wise, on which there is mounted a removable tank plug 150. Thus, the compressible fluid can be injected into the compression chamber, for example prior to the gas generation or during the gas generation to compensate for any leaks of compressible fluid.

Figure 8:
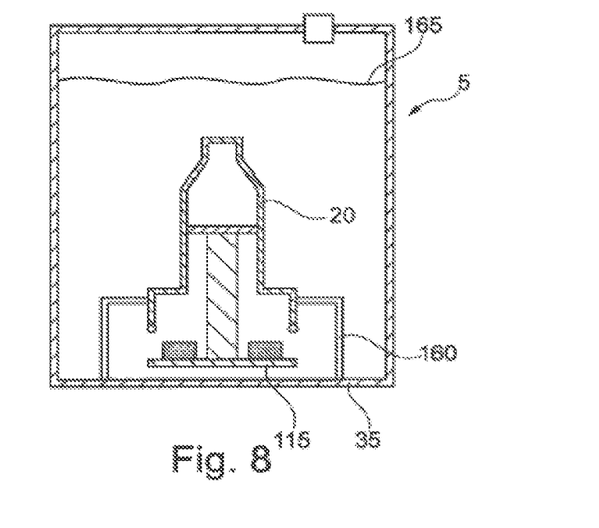

The apparatus illustrated in FIG. 8 differs from the apparatus illustrated in FIG. 1, in that the catalytic device is such that the cover 115 of the piston faces the bottom 35 of the enclosure. In order to allow the displacement of the piston in the enclosure, the catalytic device is kept at a distance from the enclosure by means of a spacer 160 in the form of fixing lugs. When the interior space comprises the reactive liquid as illustrated, the piston is situated at a greater distance from the free surface 165 of the reactive liquid in the open position of the device than in the closed position. The apparatus illustrated in FIG. 8 offers the advantage of allowing the exposure of the catalyst with the reactive liquid when the volume of reactive liquid remaining following the gas generation is low in the enclosure. It is particularly suited to the case in which the catalytic device has a height greater than the height of the reactive liquid in the enclosure when the interior space of the enclosure is entirely filled with reactive liquid, the heights being measured in the direction of gravity.

EXAMPLES

The invention is illustrated by means of the following nonlimiting examples.

Comparative Example

A gas generation test is performed with an apparatus as illustrated in FIG. 1, in which there is disposed a catalytic device in the form of a buoy described in WO 2012/003112. The catalytic device comprises 700 mg of cobalt ruthenium deposited on a metal and porous metallic catalysis support with a weight of 400 mg and the interior space of the enclosure, with a volume of 1600 ml, containing 500 g of a solution of sodium borohydride. The compression chamber of the catalytic device contains air.

The apparatus is linked to an adjustable flow meter which imposes a setpoint flow rate of 1000 ml/min.

Figure 9:
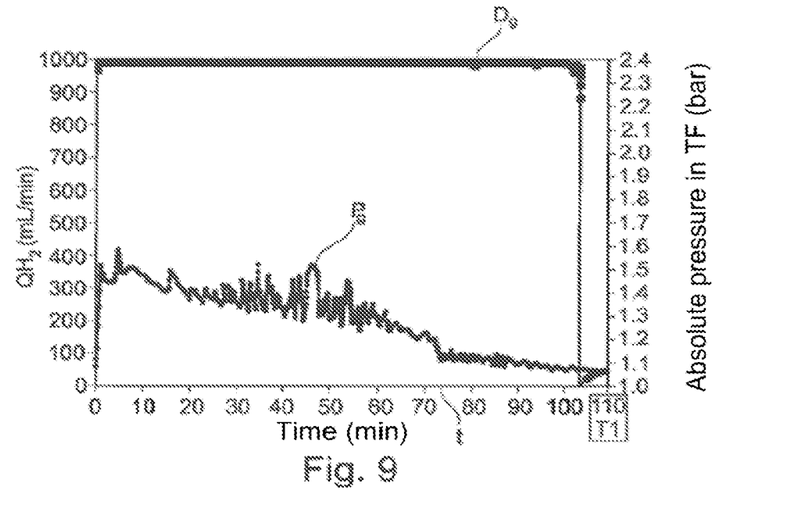
FIGS. 9 and 10 are graphs representing the trend of the flow rate and the trend of the pressure in the enclosure of a non-inventive apparatus and of an apparatus according to the invention respectively, during the implementation of the method for generating dihydrogen by means of said apparatuses.

FIG. 9 illustrates the trend of the pressure Pg of dihydrogen generated by bringing the hydride solution into contact with the catalyst in the enclosure, and the trend of the flow rate Dg of dihydrogen during the gas generation as a function of the time t of implementation of the dihydrogen generation method.

At $t_0=0$, the catalytic device is disposed in open configuration. The reactive liquid penetrates into the catalysis chamber and enters into contact with the catalyst. The setpoint flow rate is immediately reached and the pressure increases in the chamber, until the piston is pushed back to the closed position. Opening and closing cycles of the buoy of WO 2012/003112 thus take place such that the setpoint flow rate is maintained throughout the gas generation, until the pressure reaches 1.1 bar. The dihydrogen pressure in the enclosure decreases at $t_1=110$ min. From that moment, the pressure in the enclosure becomes equal to atmospheric pressure. The apparatus of the prior art can no longer produce gas in a sufficient quantity to ensure the setpoint flow rate. A total volume $V_1=110$ l of gas is thus produced. Hydrides remain in the aqueous solution, but their low concentration in the solution and the restricted accessibility to the catalyst leads to a lowering of the generated gas flow rate, which becomes less than the setpoint flow rate.

Thus, the yield of the method, defined as the ratio between the total weight of hydrogen generated and the total weight of solution of the method of the prior art is 1.8%.

Example According to the Invention

A gas generation test was performed with the apparatus illustrated in FIG. 1 comprising the same quantities of catalyst and of sodium borohydride solution as in the comparative example.

The catalytic device is dimensioned so that, in the extreme open position, the air pressure within the compression chamber is equal to 1.25 bar.

Figure 10:
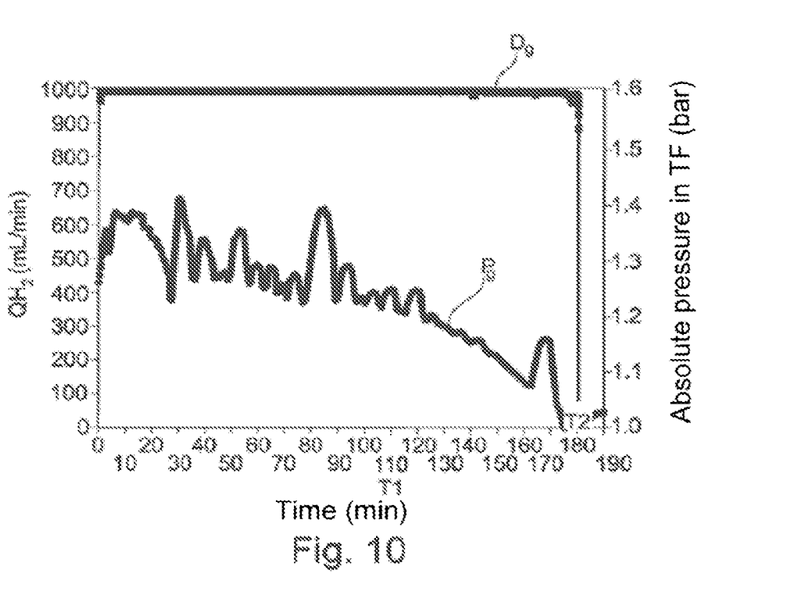

FIG. 10 illustrates the trend of the pressure Pg and flow rate Dg of dihydrogen in the enclosure as a function of the time t of implementation of the dihydrogen generation method.

At the instant $t_0=0$, the catalytic system is disposed in open position. The gas generation and the generated gas setpoint flow rate is reached (value of 1000 ml/min) from the first cycle of implementation of the method.

The gas generation continues until the concentration of hydrides is too low to maintain the setpoint flow rate (instant $t_1=180$ min), as is observed in FIG. 10. A total volume $V_2=180$ l of dihydrogen is thus produced.

Thus, the dihydrogen yield of the method according to the invention is 3.0%.

As emerges clearly from the present description, the generation of gas, notably of dihydrogen, by means of an apparatus provided with the device according to the invention, can easily be adapted according to the application for which the generated gas is intended. Notably, the range of pressure of the gas at the output of the apparatus can be set by a choice matched to the stroke of the piston and the pressure and volume of compressible fluid in the extreme open position. The invention makes it possible to initiate a dihydrogen generation efficiently, reliably and safely with a high yield.

Obviously, the invention is not limited to the embodiments of the apparatus and of the device according to the invention and to the modes of implementation of the method described and represented.

Notably, the catalytic device can be disposed outside of the enclosure of the apparatus. The enclosure can comprise a reactive liquid other than an aqueous hydride solution and be intended to generate a gas other than dihydrogen, for example oxygen.

The invention claimed is:

1. A gas generation apparatus comprising:
an enclosure,
a hollow body,
a piston, and
a catalyst,
the enclosure defining an interior space containing a reactive liquid,
the piston being housed in the hollow body,
the piston and the hollow body defining a catalysis chamber and a compression chamber,
the catalyst being housed in the catalysis chamber,
the piston being mobile between a closed position in which the catalysis chamber is leakproof to the reactive liquid, and at least an open position in which the reactive liquid enters the catalysis chamber and contacts the catalyst for generating the gas,
the compression chamber containing a compressible fluid and being closed and leakproof to the compressible fluid, the compressible fluid acting as a spring which opposes closure of the catalysis chamber,
a pressure of the compressible fluid being greater than 1.1 bar in an extreme open position where the piston is at an end of its stroke, and
the enclosure comprising a gas discharge aperture provided at a distance from the catalysis chamber.

2. The gas generation apparatus according to claim 1, wherein the catalyst is suitable for catalyzing hydrolysis of an aqueous solution comprising a hydride.

3. The gas generation apparatus according to claim 2, wherein the catalyst comprises more than 95.0% of a metal chosen from among platinum, ruthenium, cobalt, nickel and alloys thereof.

4. The gas generation apparatus e according to claim 1, the compressible fluid being a gas.

5. The gas generation apparatus according to claim 4, the compressible fluid being chosen from among an inert gas and air.

6. The gas generation apparatus according to claim 1, wherein the body comprises a relief valve configured to drain the compressible fluid from the compression chamber.

7. The gas generation apparatus according to claim 1, comprising an abutment disposed so that the piston bears against said abutment in the extreme open position.

8. The gas generation apparatus according to claim 1, wherein the pressure of the compressible fluid in the compression chamber in the closed position is greater than the pressure of the compressible fluid in the compression chamber in the extreme open position.

9. The gas generation apparatus according to claim 1, wherein the catalyst is fixed to the piston and/or to the hollow body.

10. The gas generation apparatus according to claim 1, wherein the catalyst is disposed on a catalysis support, in the form of a block of a thickness greater than 1 mm, or is in the form of a covering having a thickness less than 1 mm.

11. The gas generation apparatus according to claim 10, wherein a percentage by weight of the catalyst, expressed on the basis of a sum of the weight of the catalysis support and weight of the catalyst, is greater than 50.0%.

12. The gas generation apparatus according to claim 1, wherein the piston comprises a cover, the cover being supported over the hollow body in the closed position and completely blocking the catalysis chamber, and being disposed at a distance from the hollow body in the open position.

13. The apparatus according to claim 1, wherein the piston, the hollow body and the catalyst are disposed at least partially in the interior space of the enclosure.

14. The apparatus according to claim 1, wherein the piston is closer to a free surface of the reactive liquid in the closed position than in the open position.

15. The apparatus according to claim 1, wherein the piston, the hollow body and the catalyst are disposed fully in the interior space of the enclosure.

16. A gas generation method based on bringing a reactive liquid into contact with a catalyst of a gas generation reaction, the method comprising the following successive steps:
- providing the apparatus according to claim 1, and
- placing the catalysis chamber in the open position, so that the reactive liquid enters into contact with the catalyst.

17. The method according to claim 16, wherein:
- the gas is dihydrogen,
- the catalyst is suitable for catalyzing hydrolysis of an aqueous solution comprising a hydride, and
- the reactive liquid is an aqueous solution comprising a hydride.

\* \* \* \* \*